United States Patent [19]

Schendel

[11] 4,022,061
[45] May 10, 1977

[54] CENTROID TARGET FLOW METER

[76] Inventor: Robert E. Schendel, 10298 Hammerly, Houston, Tex. 77043

[22] Filed: Nov. 17, 1975

[21] Appl. No.: 632,636

[52] U.S. Cl. .................................. 73/228; 73/3
[51] Int. Cl.² .................................. G01F 1/28
[58] Field of Search .......................... 73/228, 3

[56] References Cited
UNITED STATES PATENTS

| 1,917,317 | 7/1933 | Nacey | 73/228 |
| 2,765,656 | 10/1956 | Parshall | 73/228 |
| 2,857,762 | 10/1958 | Parshall et al. | 73/228 |
| 2,966,133 | 12/1960 | Hube | 73/228 |
| 3,098,384 | 7/1963 | Nusbaum | 73/228 |

Primary Examiner—James J. Gill
Assistant Examiner—Anthony V. Ciarlante
Attorney, Agent, or Firm—Michael L. Parks

[57] ABSTRACT

This invention relates to a target flow meter and method of calibrating same adapted for use in various configurations of conduit and for movement from one conduit configuration to another comprising a housing connected to a conduit; a target means adapted for insertion into conduits for providing a constant centroid target area for the fluid relative to the conduit area for any level of fluid in a conduit; a meter body adapted for connection to the housing and for movement from one conduit to another; a mounting means for connecting the target means to the meter body for movement; force transfer means in relation to the target means for constant proportional transfer of force from the target centroid to the force transfer means in response to fluid level and movement in the conduit, and transducer means connected to the meter body for receiving the force transferred from said force transfer means and for measuring the fluid flow as a function of the force on the force transfer means; and further this invention relates to a method for calibrating a flow meter having a visually marked point in known relation to the centroid area of the target comprising attaching a force applying means to said visual marked point and applying a known force to the target at the known visual point on the target.

14 Claims, 5 Drawing Figures

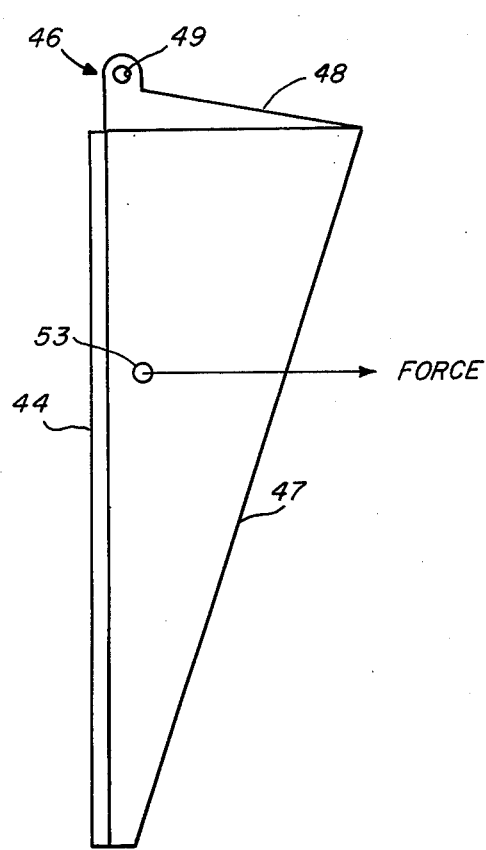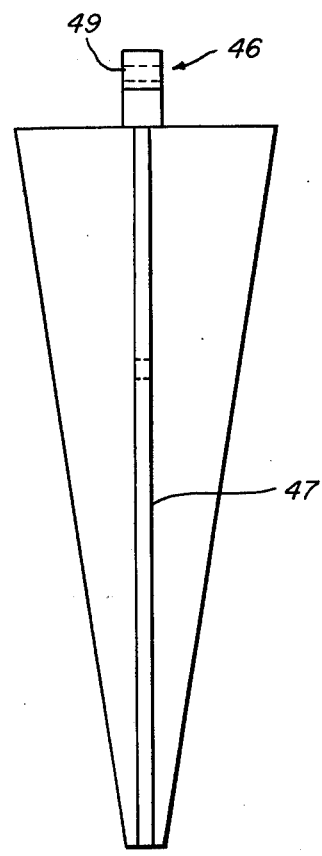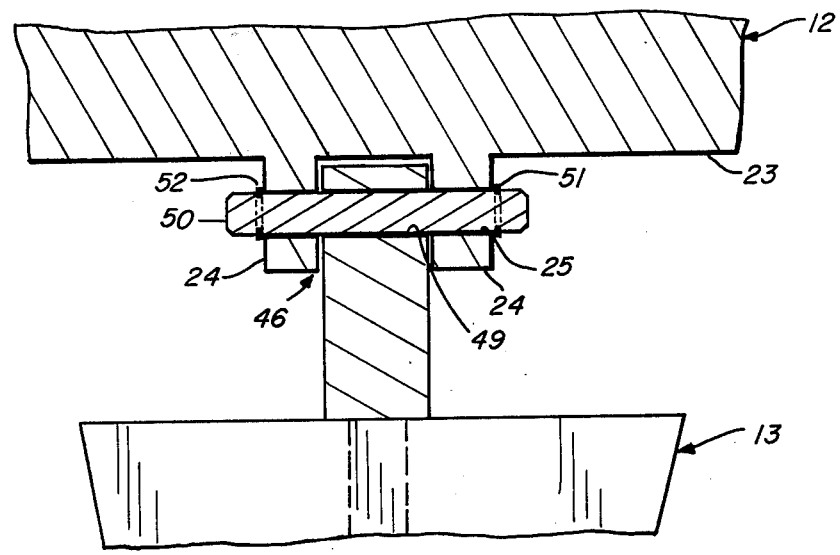

CENTROID TARGET FLOW METER

This invention is related to a target flow measuring device which can measure flow in partially filled conduits and can be moved from one conduit fluid carrier to another conduit fluid carrier of a different configuration without making changes or adjustments in the meter sensing equipment.

It is often desirable to obtain a reading of the flow in a conduit which is in fact only partially filled and the target meters of the prior art have generally been unable to read the level of flow in a partially filled conduit. The reason that the prior art meters cannot read partially filled conduit is because the targets required the full pressure of the fluid on the target in order to get an accurate reading of the flow level of the conduit. For example, target meters have been unavailable for use in the sanitary sewer and oil field mud applications because of the problems associated with partial flow at any given time.

Flow meters such as the flow meter of W. E. Nusbaum, U.S. Pat. No. 3,098,384, have been developed for providing a means for reading flow in partially filled flow lines; but, the prior art such as Nusbaum has been defective for various reasons. For example, this prior art has been defective because the target itself is directly connected to the strain gauge for electrical readout or flow sensing; and thus the blade or target is deformed in profile to get an electrical readout of the strain gauge. In such an arrangement the blade or target itself and the strain gauge are in such close proximity to the flow in the conduit, that in corrosive environments, such as sewer lines, the quality of the readout data is effected and the corrosion can cause failure in the electrical wiring and sensing head.

Also, the prior art flow meters required a target of a predetermined size which had been calibrated for the amount of strain force produced by a particular target and a change in the target required a change in the sensing heads or the strain gauge in order to provide an accurate flow measurement. Also, the flow meters of this prior art could not be transferred from one conduit to another without a complete change of the meter and targets. Thus multiple meters and targets are required for setting into various conduits of various sizes which requires a large inventory of meters and targets.

Also the targets of the prior art are very expensive because they must be made of a material which can flex and deform without damage to the target. Usually such material requires special alloys and heat treating to bring the material up to standard and this raises its cost.

Also for the prior art type meters to be accurate, the target must have a relatively constant co-efficient of thermal expansion lest temperature changes produce strains in the blade which will be read a false flow.

Further the prior art meters require a special bonding of the strain gauge to the target so that the strain gauge can accurately reflect the change in the target. This special bonding drives up the cost of the meters and provides a weak point for the failure of the meters.

In the prior art type meters, the targets are thin which cause an increase in the vibrator noise level in the strain gauge signal and produce errors.

Also the prior art target flow meters must be made of relatively thin materials which allows flexing of the target to get a reading of the strain, but thin targets are subject to being broken if hit by various objects which have been known to flow in sewer lines and mud lines. If a heavy material is used for the target, then there is not sufficient deformation of the material to get a good reading.

It is therefore the principal objects of the present invention to provide a relatively simple target flow meter which can be adapted for accurately measuring the flow of various flow conditions in various sizes of conduit. The flow conditions varying from partially filled conduit to fully filled conduits. In the flow meter of this invention, a relatively simple device is provided for use in various sizes of conduits as well as varying flow conditions in conduits. In this invention the meter is also adapted for movement from one conduit size to another conduit size without readjusting the instrument package of the flow meter. The adjustment which is required in this invention is a simple mechanical adjustment of the target by putting on a different target and moving at another location on the meter such that the target is capable of being inserted into the new conduit and housing.

It is further the object of this invention to provide a target which is not directly connected to the strain gauge for electrical readout or for the sensing of flow. This indirect connection allows the target to be in the environment of the conduit and the sensing device to be removed from that environment and thus protected from corrosive environment.

It is a further object of this invention to provide a flow meter which is capable of reading storm sewers, sanitary sewers, and oil field mud lines which have partial flow at some occasions and full flow at other times.

Also it is an object of this invention to provide a flow meter which can resist damage from various objects which are sometimes carried by the flow of fluid.

It is a further object of this invention to provide a flow meter which can measure the flow of slurrys, such as coal, sand, pulp, etc.

It is also an object of this invention to provide a flow meter which provides for a means of changing targets mechanically by those relatively unskilled in instrument arts and which does not require a change in the sensing head or the strain gauge in order to provide an accurate measurement of flow.

It is a further object of this invention to provide a meter body which can be used in any size or shape of conduit and only requires a simple adjustment in the target for the meter to be used in any size line, thus the meter of this invention does not require multiple meters for multiple line sizes.

Also an object of this invention is to provide a target which is relatively inexpensive and can be made of a very common metal or material.

It is also an object of this invention to provide a target and meter which is not sensitive to thermal expansion from changing temperatures in the fluid and/or conduit.

It is also an object of this invention to provide a meter which is mechanically attached to the meter body and does not require any special bonding of a strain gauge or sensing equipment to the target.

It is also an object of this invention to provide a flow meter which may read flow in a conduit in either direction in the conduit so that back flow can be measured.

It is a further object of this invention to provide a target which provides a relatively low level of background noise on the strain gauge and thus produces a more accurate reading.

Also it is an object of this invention to make the target relatively thick, which prevents flexing and an inaccurate reading of the flow.

It is yet a further object of this invention to provide a target of such thickness and rigid material to prevent it from being damaged by various objects which have been known to flow in sewer and mud lines and thus prevent breakage of the target.

It is a further object of this invention to provide a flow meter which can read flow of fluids over a wide range of flow conditions.

Other objects and advantages of this invention will become apparent from the following description taken in connection with accompanying drawings, wherein are set forth by way of illustration and example certain embodiments of this invention.

DESCRIPTION OF THE DRAWINGS

FIG. 3 is the target element in side elevation.

FIG. 4 is the target from the rear elevation.

FIG. 5 is the target as connected to the meter body.

Figure 1:
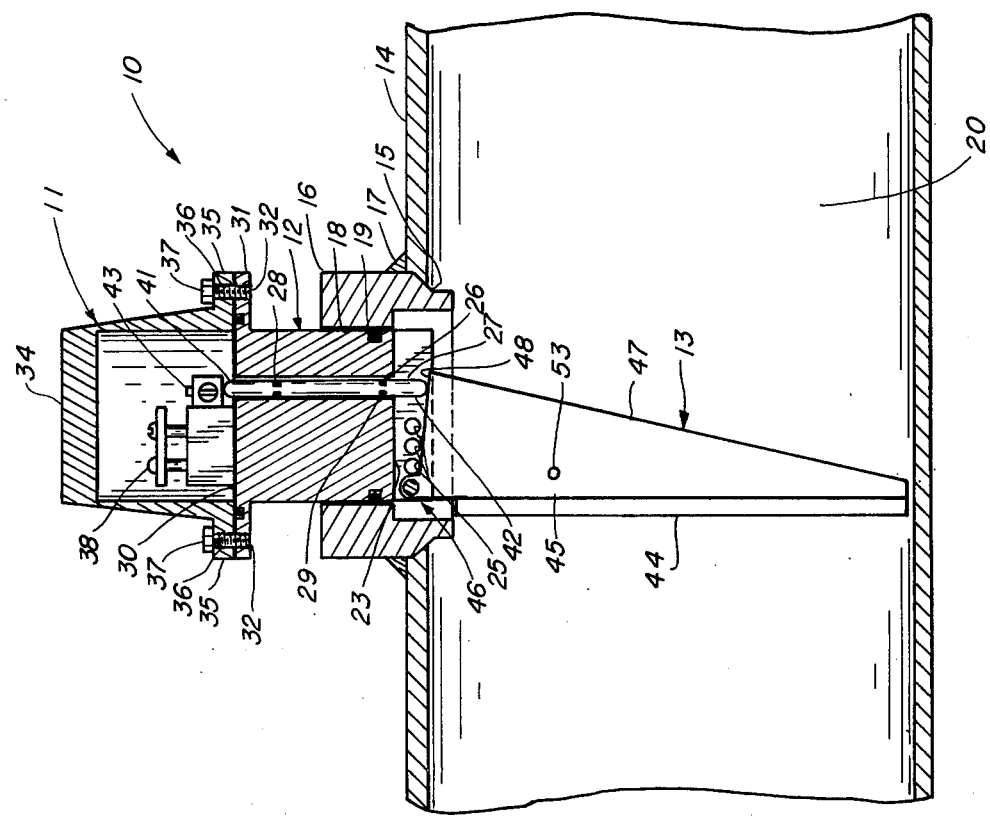
FIG. 1 is a cross sectional view through the flow meter and target in a side elevation view of the target and conduit.

The flow meter of this invention is referred to generally at 10 of FIG. 1. In the flow meter 10 of this invention the functional parts are generally referred to as an instrumentation 11, meter body 12, and the target 13. The flow meter 10 in this embodiment is shown mounted to a conduit 14 at a point on the conduit 14 where a hole 15 has been made in the conduit 14 for the insertion of the flow meter 10 of this invention. Attached to the conduit 14 about the hole 15 is a housing 16 which has been welded to the conduit 14 by a weld bead 17. It should be understood that there may be other ways of attaching the housing 16 to the conduit 14, but welding is at least one way in this embodiment of attaching the housing 16 to the conduit 14.

The housing 16 is, at least in this embodiment, provided with a channel 18 through which the meter 10 of this invention may be inserted to pass into communication with the inside of the conduit 14. The channel 18 is machined to provide a good fit of the meter 10 of this invention into the channel 18 of the housing 16. In this embodiment, an o-ring seal 19 is provided to form a fluid seal between the inside of the conduit or a conduit cavity 20 and the ambient environment outside the conduit 14.

Figure 2:
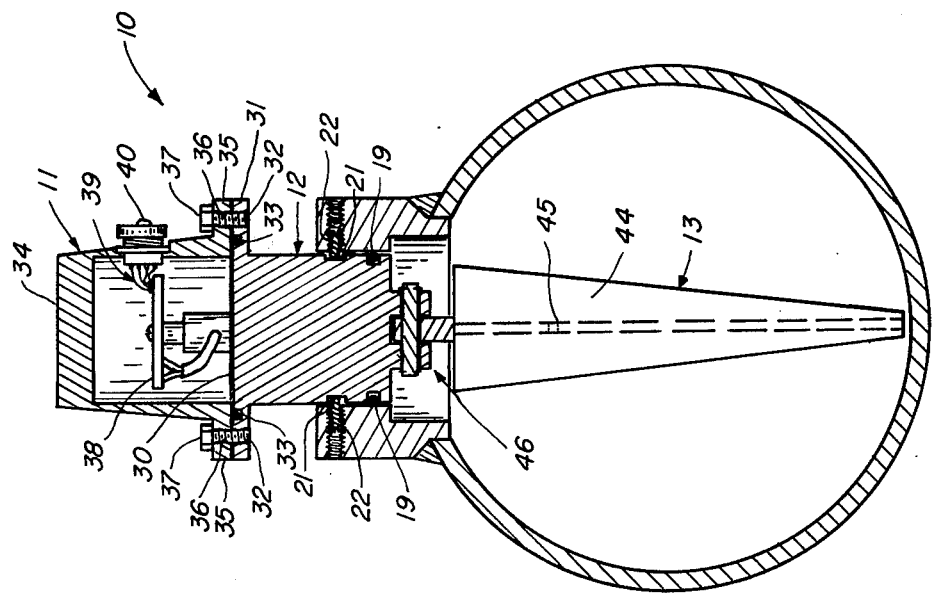
FIG. 2 is a cross sectional view in front elevation through the flow meter and conduit on which said flow meter is mounted.

The meter body 12 is the portion of the meter 10 which is in sealed relationship with the o-rings 19 and channel 18 of the housing 16 to seal the conduit cavity 20 from the ambient environment. Also as shown in FIG. 2, the meter body 12 is provided with facets 21 for receiving fasteners 22 to hold the meter 10 of this invention in place in the housing 16. Also these facets 21 are provided to allow cooperation with the fasteners 22 for limited up and downward adjustment of the meter body 12 of this invention in the housing 16 and the target 13 in the conduit cavity 20. The facets 21 further cooperate with the fasteners 22 to prevent rotation of the meter body 12 in the channel 18 when torquing moments are imparted to the meter 10 by the flow of fluid in the conduit 14.

The bottom 23 of the meter body 12 is inserted into the channel 18 and is exposed to the conduit cavity 20.

Connected to the bottom 23 of the meter body 12 are paired ridged member 24, as best shown in FIG. 5, which extends downward from the bottom 23 of the meter body 12 into the conduit cavity 20. The paired ridged members 24 have a series of apertures 25 in a line along the paired ridged members 24. Also along the bottom 23 of the meter body 12 is provided an opening 26 which extends through the meter body 12. This opening 26 is provided for the insertion of a push rod 27 which is movable from top to bottom in the opening 26. The push rod 27 has, at least in this embodiment, o-rings seals 28 and 29 to form a sealed sliding surface between the conduit cavity 20 and the instrumentation 11 thus the push rod 27 may freely move in the opening 26 while sealing the conduit cavity 20 from the instrumentation 11.

The meter body 12 has a top surface 30 which is provided with a flange 31. The flange 31 has bolt holes 32 drilled therethrough for the attachment of the instrumentation 11 of the flow meter 10 of this invention. Along the top surface 30 of the meter body 12 is provided a seal 33 to seal the instrumentation 11 from the ambient air. Forming a part of the seal is the instrumentation housing 34 which has a flanged surface 35 in sealing engagement with the top surface 27 of the meter body 12 and the seal 33. Through the flanged surface 35 of the instrumentation housing 34 are provided bolt holes 36 which are aligned with the bolt holes 32 of the meter body 12 for the insertion of bolts 37 to fasten the instrumentation 11 and the meter body 12 together. Within the instrument housing 34 is provided a standard strain gauge 38 which converts strain into an electrical signal which is functionally related to the amount of strain induced. The strain induced in at least one embodiment of this invention is through the push rod 27 which is connected to the strain gauge 38 on one end 41 of the push rod 27. The other end 42 of the push rod 27 is positioned adjacent the target 13 to transmit force from the target 13 through the push rod 27 to the strain gauge 38. Also in some embodiments of this invention, the push rod 27 may be connected to the target 13 at one end 42 for reading a back flow or movement of the target in another direction in response to flow.

In some embodiments an adjustable stop 43 is provided to prevent the push rod 27 from over straining the strain gauge 38 and damaging it. The strain gauge 38 can be of any standard type which will transduce force strain into an electrical signal. The electrical signal produced in the strain gauge is then converted to a readout system 39 which gives a visual gauge read on a meter 40 as shown in FIG. 2.

Movably attached to the bottom 23 of the meter body 12 is the target 13 which extends down from the bottom 23 of the meter body 12 into the conduit cavity 20 for receiving the flow pressure of the fluid in the conduit 14. As shown by comparing the target 13 position in FIG. 1 and FIG. 2, the target 13 has a target pressure surface 44 which is set at right angles to the flow of the fluid in the conduit cavity 20.

The target pressure surface 44 in this embodiment has a surface area configuration which provides a centroid area 43 having a constant effective length of the target 13 over which that fluid force acts no matter what the flow conditions in the conduit. This effective length on the target 13 is from the centroid area 45 to a point of attachment 46 of the target 13 to the meter body 12.

In a relatively round conduit cavity 20 as shown in FIG. 2, the target pressure surface 44 is shaped to provide a constant centroid area 45 to the flow of fluid in the conduit cavity 20 whether there is little flow or a completely filled cavity. The centroid area 45 is maintained by the configuration of the target pressure surface 44 which provides a relatively long lever arm and smaller surface area when the flow is low or less than a full conduit cavity 20. But when the conduit cavity 20 is full, the force exerted by the fluid is of course greater but the length of the target pressure surface 44 exposed to the flow of fluid at the point of attachment 46 of the target 13 to the meter body 12 provides a short lever arm, thus an averaging of forces occurs at the centroid area 45 of the target 13. The portional adjustment of the target area configuration to conduit cavity area thus provides a target pressure surface 44 which has the effect of averaging the pressure exerted on it over the target 13 in relation to the conduit cavity area whether low flow or completely filled. The centroid area 45 thus creates a constant lever arm no matter what the flow condition because the centroid 45 remains constant over any given flow condition in the conduit 14.

The target 13 in this embodiment has a ridged reinforcing member 47 connected along the target 13 on the opposite side of the target pressure surface 44 to reinforce the target 13 against being bent or damaged by any debris which might be in the fluid flow in the conduit 14. A portion of the ridged reinforcing member 47 extends from the point of attachment 46 of the target 13 along the bottom 23 of the meter body 12 to form a lever arm 48. The lever arm 48 is positioned as can best be seen in FIG. 1, where the target 13 is attached to the meter body 12 at the attachment point 46 and the lever arm 48 is shown acting against the push rod 27 in response to the force exerted on the target pressure surface 44 by the fluid in the conduit 14. The effective length of lever arm 48 is determined by the distance of the lever arm 48 as measured from the point of attachment 46 to the point at which the lever arm 48 acts on the push rod 27. Thus in this invention the forces exerted by the flowing fluid act on the target 13 over an effective constant distance as determined by the distance from the centroid area 45 to the point of attachment 46 of the target 13 and that force is then transmitted to the predetermined length of lever arm 48 for a the proportional transfer of the fluid force through the target 13 to the push rod 27. Thus the force acting on the target pressure surface 44 is transmitted to the push rod 27 over a known mechanical advantage or relationship from which a computation of the force transmitted to the strain gauge 38 can be made for determining the flow in the conduit 14.

In at least one embodiment as shown in FIG. 5, the point of attachment 46 of the target 13 to the meter body 12 is formed by providing an aperture 49 through a portion of target 13 adjacent the point of attachment 46. The aperture 49 of target 13 is then inserted between the paired ridged members 24. The apertures 25 of the paired ridged members 24 are aligned with the aperture 49 of the target 13 and a pin 30 is inserted through the aligned apertures 25 and 49 for pivotally attaching the meter body 12 to the target 13. The pin 50 is held in place by lock rings 51 and 52 respectively.

It should be noticed in FIG. 1 that the paired ridged member 24 have a series of apertures 25 there along for pivotaly mounting targets 13 of various sizes to the meter body 12 at different apertures 25. Thus the series of apertures 25 provide a means to adjust the length of the lever arm 48 for different sized targets having different centroids, by pulling pin 50 and reinserting it at another aperture 25 which may make the distance between the point of attachment 46 and the point on the lever arm 48 which acts on the push rod 27 longer or shorter depending on which way the point of attachment 46 is moved. If it is moved toward the push rod 27, the lever arm 48 is shortened, but if it is moved away from the push rod 27 then the lever arm 48 is lengthened. In this embodiment of this invention the ratio of lengths of the centroid area 45 to the point of attachment 46 of the target 13 and the lever arm 48 of target 13 must, remain constant for any give precalibrated strain gauge to provide interchangably of the targets and meters from one size conduit to another by changing the target 13 without recalibrating the instrumentation 11. This interchangability is accomplished by selecting the proper point of attachment 46 for the particular target size to maintain the same mechanical ratio of lever arm lengths which transmit the forces to the push rod 27.

By allowing easy mechanical adjustment of the targets to fit any size conduit without recalibrating the instrumentation 11, relatively unskilled people may move the flow meter from one size conduit to another. Also the only inventory required for multiple size conduit uses is an inventory of targets because the meter body 12 and instrumentation 11 may be used on any size line without recalibration of the proper point of attachment 46 is used for a given target 13.

Also by using a visual point 53 on the target 13 in a known relation to the centroid area 45 and by applying a known force thereto, a method is provided for the easy calibration of the flow meter of this invention. The method of this invention may be accomplished in several ways. In one embodiment a force line is attached to the visual point 53 and then a known force is applied to the force line. By comparing the known force applied to the visual point 53 on the target and the reading of the flow meter 40 an accurate calibration of the meter may be made.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A flow meter adapted for use in various configurations of conduit and levels of flow therein comprising
   a housing connected to said conduit;
   b. a target means adapted for insertion into said conduit area for providing a constant centroid target area for the fluid relative to said conduit area for any level of fluid in said conduit;
   c. a meter body means adapted for connection to said housing;
   d. a mounting means for removably connecting said target means to said meter body means for movement;
   e. a force transfer means in relation to said target means for limited movement and for constant proportional transfer of force from said target means to said force means in response to fluid level and movement in said conduit;
   f. transducer means connected to said meter body means for receiving said force from said force transfer means to measure the fluid flow as a function of the force on said force transfer means.

2. The flow meter of claim 1 wherein said mounting means for connecting said target means to said meter body means provide for pivotal movement of said target means.

3. The flow meter of claim 2 wherein said mounting means is adopted for connecting said target means along said meter body for receiving different target means for use in various conduit configurations and for maintaining a constant proportional mechanical advantage for the transfer of force from the centroid of said target to said transducer means.

4. The flow meter of claim 2 wherein said mounting means for removably connecting said target means to said meter body means for rotational movement is a pivotal connecting means.

5. The flow meter of claim 4 wherein said force transfer means is a lever arm connected to said target means in relation to said centroid area for a predetermined constant proportional mechanical advantage for the transfer of force from said target to said transducer means in response to fluid level and movement in said conduit.

6. The flow meter of claim 4 wherein said force transfer means further comprises a transfer means connected to said meter body for limited movement and for transferring force to said transducer means, and
a means connected to said target means for forming a lever arm means to act against said transfer means.

7. The flow meter of claim 6 wherein the distance from said centroid on said target to the mounting means and the distance of said lever arm means from the mounting means to said transfer means are proportional for a relatively constant mechanical advantage.

8. The flow meter of claim 6 wherein said mechanical transfer means is a push rod movably mounted for limited movement in said meter body for force transfer from said lever arm to said transducer means.

9. The flow meter of claim 8 further comprising adjustable fastener means for removably fastening said housing and meter body means in said housing and for providing limited vertical adjustment of said meter body means to compensate for non-uniform flow lines and target means relative to said conduit configuration for free movement of said target means in said conduit.

10. The flow meter of claim 9 further comprising variable attachment means on said meter body for selectively connecting said target means thereto to provide said constant mechanical relationship between said centroid target area and said force transfer means when said centroid target area is changed by changing the size of said target means.

11. The flow meter of claim 9 wherein the variable attachment means on said meter body for selectively connecting said target means to said meter body are further comprising;
a pivotal pin means for removably fastening said target means to said meter body and a series of aperatures selectively arranged on said meter body for receiving said pivot pin means for removably fastening said target means thereto.

12. The flow meter of claim 11 wherein said selected series of aperatures are arranged for providing a relatively constant mechanical advantage for various size targets connecting said target to said meter body at said aperatures to provide a distance from said centroid on said target to the aperature and the distance of said lever arm mean from said aperature to said transfer means are the same proportional distance for various sizes of targets.

13. The flow meter of claim 11 further comprising an attachment means on said target means in known relation to said centroid of said target for calibration of said flow meter by applying a known force on said attachment means on said meter.

14. The flow meter of claim 13 wherein said attachment means is an aperature on said target.

* * * * *